United States Patent [19]
Watson

[11] 3,874,712
[45] Apr. 1, 1975

[54] CRIMP-ON CLAMP FOR FLEXIBLE DUCT

[75] Inventor: David G. Watson, Meadville, Pa.

[73] Assignee: Eagle-Picher Industries, Inc., Cincinnati, Ohio

[22] Filed: Apr. 11, 1974

[21] Appl. No.: 460,074

[52] U.S. Cl. ............. 285/236, 285/311, 285/369, 24/270
[51] Int. Cl. ............................................. F16l 21/00
[58] Field of Search .......... 285/236, 311, 365, 369, 285/252, 409, 417; 24/270, 273

[56] References Cited
UNITED STATES PATENTS

| | | | |
|---|---|---|---|
| 3,007,722 | 11/1961 | Anderson et al. | 24/270 X |
| 3,233,922 | 2/1966 | Evans | 285/369 X |
| 3,237,267 | 3/1966 | Angus | 24/270 |
| 3,276,089 | 10/1966 | Cheever et al. | 24/270 |

*Primary Examiner*—Andrew V. Kundrat
*Attorney, Agent, or Firm*—Wood, Herron & Evans

[57] ABSTRACT

A clamp for flexible ducting formed by flexible material supported on a helical wire. The clamp includes an over-center toggle link, one end of which is connected to the free end of the wire by means of a socket crimped to the wire and the other end is connected to an adjacent convolution by a V-shaped connector crimped to the convolution.

10 Claims, 5 Drawing Figures

CRIMP-ON CLAMP FOR FLEXIBLE DUCT

This invention relates to a clamp for flexible ducting, and more particularly to a toggle clamp which is permanently secured to one or both ends of a flexible ducting.

The flexible ducting to which the invention is applied consists of a generally helical wire and a flexible material such as rubberized sheeting or elastomeric tape covering the wire to form ducting suitable for use in conveying low pressure air. Such ducting is in common use and is connected to the tubular end of a fitting or adaptor by means of a clamp.

It has been the practice to clamp the ducting to a fitting by means of a separate clamp usually in the form of a sheet metal strap which is tightened about the ducting and fitting by means of a screw and nut joining two ends of the clamp. Another type of clamp is shown in U.S. Pat. No. 3,237,267 wherein the free ends of a metal strap are interconnected by a link to form an over-center toggle connection through which the tightening of the clamp about a fitting is effected.

Attempts have been made to provide a clamp which is integral or a permanent part of the flexible ducting in order to eliminate the need to apply a separate clamp. These include a clasp having a tightening linkage, the two ends of which are stapled to adjacent points of a flat wire convolution forming a part of the ducting.

An objective of the present invention has been to provide a clamp for a round wire supported flexible ducting, the clamp being permanently secured to the ducting. To this end the invention provides a three element toggle linkage, two of the elements having means to secure the toggle linkage to the free end of the round wire at one end of the linkage and to an adjacent convolution of the round wire at the other end.

More specifically, the invention includes a central link which is pivotally secured at end to a strap, the strap having a socket which receives the free end of the round wire and is clamped thereto. The other end of the link is pivotally secured to another strap which is at one end folded into a V shape. The V-shaped connector end is slid in an axial direction onto an adjacent convolution of the wire, and a crimp is formed between the V-shaped connector and the wire to secure the other end of the clamp to the ducting.

Through these securing means, the invention admits of economy at the socket connection to the free end and permits the opposite end of the clamp to be connected to a convolution of the wire without stapling or without any means more costly than a simple crimping operation.

The several features and objectives of the invention will become more readily apparent from the following detailed description taken in conjunction with the accompanying drawings in which.

Figure 1:
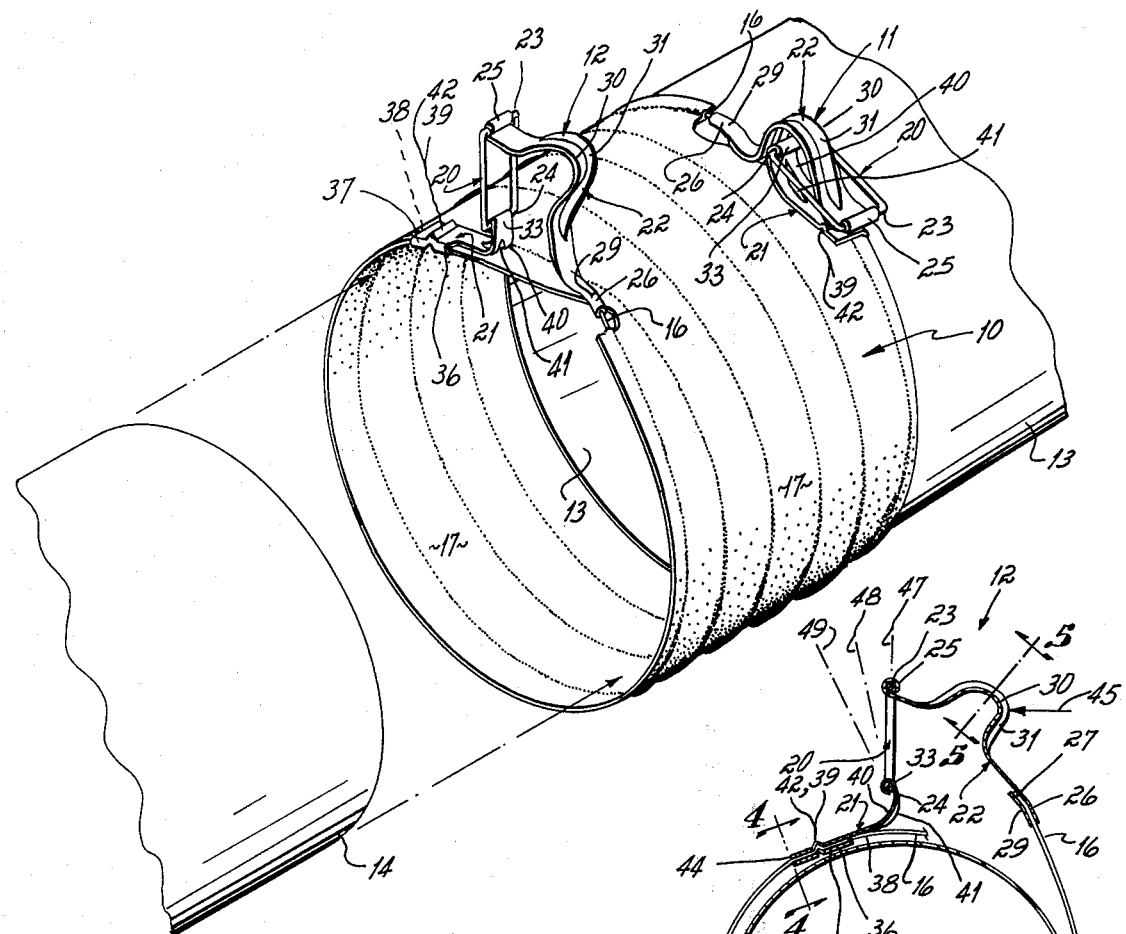
FIG. 1 is a perspective view of the invention showing a flexible duct secured between two fittings.

Referring to FIG. 1, flexible ducting 10 is shown having a clamp 11 at one end and a clamp 12 at the other end. The clamp 11 is closed to clamp the ducting to a fitting 13 over which the ducting has been slid. The clamp 12 at the opposite end of the ducting is open, thereby enlarging the opening of the ducting to permit it to receive a fitting 14. When the fitting 14 is in place within the ducting, the clamp will be closed to secure the ducting to the fitting.

The ducting is of the type which has been in common use for many years and includes a helically formed round wire 16 whose convolutions are covered by a flexible material 17 such as a rubberized sheeting or flexible elastomeric tape. The flexible material so encloses the helical wire to permit the ducting to be used in the conveying of low pressure air.

In the illustrated form of the invention, the ducting is of circular cross section. It should be understood that the clamp which is to be described hereinafter may obviously be applied to ducting of other cross sectional configurations.

The clamp is of three elements, namely, a center link 20 pivotally connected to a fixed link 21 at one end and pivotally connected to a movable link 22 at the other end. Links 21 and 22 each have a receptacle, to be described, which grips the wire 16 to secure the clamp to it. The center link 20 is generally oval shape whose ends 23 and 24 are straight in order to form a pivotal connection with the links 21 and 22.

Figure 2:
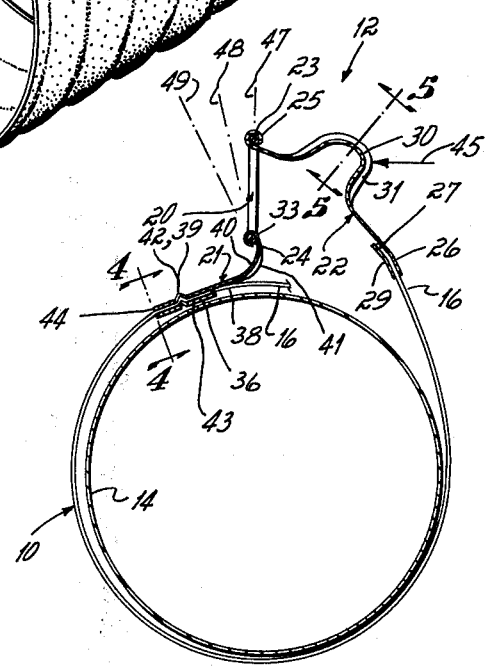
FIG. 2 is an elevational view partly in section of a clamp in open condition.
Figure 4:
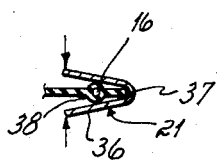
FIG. 4 is a cross sectional view taken along lines 4—4 of FIG. 2.
Figure 5:
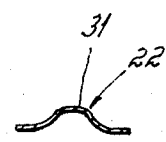
FIG. 5 is a cross sectional view taken along lines 5—5 of FIG. 2.
Figure 3:
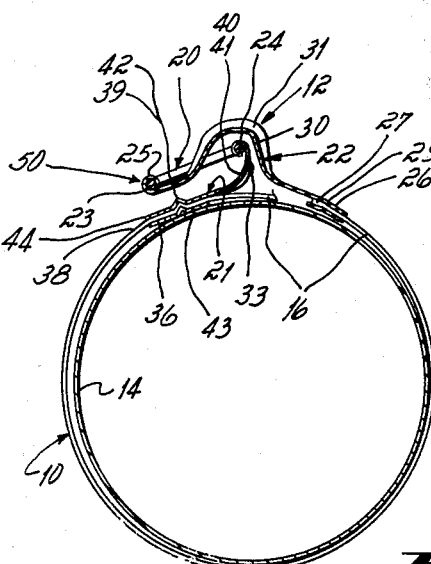
FIG. 3 is a view similar to FIG. 2 showing the clamp in an over-center closed condition.

The link 22 is formed from a sheet metal strap having one end 25 wrapped about the end 23 of the center link to form the pivotal connection. The other end 26 has a receptacle formed as a tubular socket which receives the bared free end 27 of the helical wire 16. As best shown in FIGS. 2 and 3, the free end 27 of the wire projects a substantial distance into the socket end 26 of the link 22 and a V-shaped crimp 29 is formed in the socket and wire to secure the wire in the socket. The strap forming the link 22 is bowed intermediate its ends as at 30 to permit the over-center cooperation with fixed link 21, as will be described. Additionally, the link has a longitudinal crown 31 to stiffen the strap so as to enable it to maintain its bowed configuration under the stress of the clamping pressure.

The link 21 is formed of a sheet metal strap which is initially L-shaped and has one end 33 wrapped about the end 24 of the center link 20 to form the pivotal connection thereto. The other end of the fixed link 21 has a leg 36 folded under the strap to form a V-shaped connector 37. The leg 36 and adjacent portion of the strap create two jaws which are the wire-gripping receptacle of link 21. The V-shaped connector is slid in an axial direction over the endmost or adjacent convolution 38 of the wire and embraces not only the wire but also the flexible material supported on the wire, thereby obviating any need to strip the wire bare. When the connector is applied to the wire, it and the wire are crimped, as shown at 39 in FIG. 2, to securely fasten the connector 37 to the wire against axial as well as circumferential displacement.

The crimp 39 is preferably formed on mating dies so as to form a V-shaped crimp as at 42 with the ends of the connector on either side of the crimp indicated at 43,44 to remain aligned. The alignment of the ends 43 and 44 permits the connector to lie in line with the wire about which it is crimped so as to eliminate the possibility of a significant distortion in the wire from its helical orientation.

An arucate portion 40 having a longitudinal crown 41 joins the connector 37 to the pivoted end 33 and holds the pivoted end 33 at a location spaced radially outwardly from the outer surface of the ducting 10. The outward positioning of the pivot axis of center link 20 aids in permitting the toggle clamp to lock securely in the over-center position.

The locking operation is illustrated in FIGS. 2 and 3. In FIG. 2 the end of the ducting is shown in an open position with the clamp in a stable over-center (open) position. There, all stress on the helical wire is relieved to permit the ducting to be easily slid over the end of a fitting such as 13 or 14. When the fitting is in place, the flexible ducting may be secured to it simply by closing or locking the clamp 12. This is accomplished by applying finger pressure in the direction of the arrow 45 against the bow 30 to cause the pivoted end 23 to swing from an over-center open position indicated at 47 through a center position at 48 past an over-center position at 49 to a closed over-center position 50. There it can be seen that the bow in the movable link 22 provides a concavity to receive the outwardly projecting portion 40 of the fixed link 21 and to permit the center link 20 and the movable link 22 to lie close to the surface of the ducting which is in its stable, over-center, closed position.

In the closed position the clamp has caused the outer or endmost convolution of wire 16 to be tightened around the fitting 14, thereby securing the ducting to the fitting.

I claim:

1. In a flexible ducting having a convoluted wire supporting a flexible material, a clamp at at least one end of said ducting, comprising,
   an over-center toggle clamp,
   a deformable receptacle secured to each end of said clamp,
   one receptacle receiving a free end of said convoluted wire,
   the other receptacle being clamped about the endmost convolution of the wire in said hose.

2. A ducting as in claim 1 in which said one receptacle comprises a tubular socket, said wire end extending into said socket, said socket and wire end being crimped to retain said wire in said socket.

3. A ducting as in claim 1 in which said other receptacle comprises a V-shaped sheet metal element forming a pair of jaws, said jaws being disposed around said wire and crimped thereto.

4. In a flexible ducting having a convoluted wire supporting a flexible material, a clamp at at least one end of said ducting, comprising,
   a tubular socket receiving a free end of said wire and being crimped thereto, said socket having an integral extension,
   a link having one end pivotally secured to said extension,
   a V-shaped metallic connector crimped about an endmost convolution of said wire adajcent said link, said connector having an integral extension pivotally secured to said link,
   said link and extensions being configurated to provide an over-center toggle clamp.

5. A ducting as in claim 4 in which said connector extension has an arcuate portion projecting away from said ducting,
   said socket extension having a cavity overlying said projecting section when said socket extension is in clamping position.

6. A ducting as in claim 5 wherein said flexible material is laminated about said wire,
   the free end of said wire being stripped of said flexible material and inserted into said tubular socket,
   said V-shaped connector being crimped about said flexible material and portion of the wire which the flexible material surrounds.

7. In a flexible ducting having a convoluted wire supporting a flexible material, a toggle clamp at at least one end of said ducting, comprising,
   a center link,
   a movable link consisting of a strap pivotally connected at one end to one end of said center link, the other end of said strap having a socket receiving and crimped to a free end of said wire,
   a fixed link consisting of an L-shaped strap having one end pivoted to the other end of said center link,
   said L-shaped strap having a leg folded upon the strap to form a V-shaped connector,
   said connector being positioned over an adjacent convolution and crimped thereto.

8. Ducting as in claim 7 in which said connector crimp is a V formed intermediate the ends of said connector, the remaining portions of said connector on each side of said V being in substantial alignment.

9. Ducting as in claim 7 in which said fixed clamp has an arcuate portion extending from said connector to said pivotal connection to said center link projecting said pivotal connection radially outwardly of said ducting, said arcuate portion having a longitudinal stiffening crown.

10. Ducting as in claim 9 in which the strap of said movable link has an outwardly projecting bow intermediate its ends overlying said outwardly projecting pivotal connection, said bow having a longitudinal stiffening crown.

* * * * *

UNITED STATES PATENT AND TRADEMARK OFFICE
CERTIFICATE OF CORRECTION

PATENT NO. : 3,874,712

DATED : April 1, 1975

INVENTOR(S) : David G. Watson

It is certified that error appears in the above-identified patent and that said Letters Patent are hereby corrected as shown below:

Column 3, line 43, "hose" should be changed to -- ducting --

Signed and Sealed this

Twenty-sixth Day of May 1981

[SEAL]

Attest:

RENE D. TEGTMEYER

Attesting Officer

Acting Commissioner of Patents and Trademarks